(12) United States Patent
Clark

(10) Patent No.: US 7,710,879 B2
(45) Date of Patent: May 4, 2010

(54) SYSTEM AND METHOD FOR IMPROVING THE QUALITY OF REAL TIME MULTIMEDIA SESSIONS

(75) Inventor: Alan D. Clark, Duluth, GA (US)

(73) Assignee: Telchemy, Inc., Duluth, GA (US)

( * ) Notice: Subject to any disclaimer, the term of this patent is extended or adjusted under 35 U.S.C. 154(b) by 907 days.

(21) Appl. No.: 11/313,220

(22) Filed: Dec. 19, 2005

(65) Prior Publication Data

US 2006/0268700 A1    Nov. 30, 2006

Related U.S. Application Data

(60) Provisional application No. 60/637,433, filed on Dec. 17, 2004.

(51) Int. Cl.
*G01R 31/08* (2006.01)
(52) U.S. Cl. ........................ 370/237; 370/248
(58) Field of Classification Search ................. 370/216, 370/225, 235, 237, 236, 242, 248, 249, 241.1, 370/244, 245, 252
See application file for complete search history.

(56) References Cited

U.S. PATENT DOCUMENTS

| | | | |
|---|---|---|---|
| 4,745,593 A * | 5/1988 | Stewart | 370/244 |
| 5,754,594 A | 5/1998 | Betts et al. | |
| 6,704,287 B1 | 3/2004 | Moharram | |
| 7,218,610 B2 * | 5/2007 | Sivakumar et al. | 370/230 |
| 2003/0012129 A1* | 1/2003 | Lee et al. | 370/216 |
| 2003/0048752 A1* | 3/2003 | Fontana et al. | 370/236.2 |
| 2003/0169688 A1 | 9/2003 | Mott | |
| 2004/0015765 A1 | 1/2004 | Cooper et al. | |
| 2004/0025018 A1 | 2/2004 | Haas et al. | |
| 2004/0071084 A1* | 4/2004 | El-Hennawey et al. | 370/230 |

* cited by examiner

*Primary Examiner*—Chirag G Shah
*Assistant Examiner*—Minh-Trang Nguyen
(74) *Attorney, Agent, or Firm*—Smith, Gambrell & Russell

(57) ABSTRACT

The present invention provides a system and method for improving the quality of real-time multimedia sessions wherein each endpoint of a real-time packet stream transmits (1) feedback reports that describe the quality of the stream received by the endpoint and (2) forward reports that are based on the feedback reports received by the endpoint and that describe the quality of the stream received by the other, remote endpoint. The forward reports are used by routers to re-route packets around problems in the network that are located between the router and the remote endpoint.

14 Claims, 5 Drawing Sheets

SYSTEM AND METHOD FOR IMPROVING THE QUALITY OF REAL TIME MULTIMEDIA SESSIONS

RELATED APPLICATION

This application claims the benefit of priority of U.S. provisional application Ser. No. 60/637,433, filed Dec. 17, 2004, which is relied on and incorporated herein by reference.

FIELD OF THE INVENTION

The present invention relates to network monitoring and routing systems and methods. More specifically, the present invention relates to a system and method for improving the quality of real-time multimedia sessions between endpoints in a network.

BACKGROUND OF THE INVENTION

Real-time multimedia sessions such as Voice over IP calls and videoconferences are highly dependant on the quality of the underlying packet transport network. Problems such as network congestion can materially impact the quality of the voice or video call and lead to dissatisfied users. The present invention provides a means by which the quality of real-time multimedia sessions may be improved.

Real-time multimedia traffic is typically carried in the form of RTP (Real-Time Transport Protocol-IETF RFC3550) frames encapsulated in UDP and IP packets. Some performance feedback is provided by the RTCP (Real-Time Transport Control Protocol-IETF RFC3550) protocol, notably the Receiver Report (RR-IETF RFC3550) and eXtended Report (XR-IETF RFC3611) report types.

In conventional systems, the quality of an RTP stream is measured by receiving system Y and reported using RTCP RR or XR reports to sending system X. These reports are inserted into the packet stream sent from Y to X. A real-time multimedia packet stream therefore comprises a stream of RTP frames from one endpoint system to a second endpoint system into which are inserted reports of the quality of the stream from the second endpoint system to the first.

For example, if RTP(X,Y) denotes an RTP frame being sent from X to Y and RTCP(X,Y) denotes an RTCP report describing the quality of the stream from X to Y then typical streams would resemble:

From X to Y:
RTP(X,Y)- - - RTP(X,Y)- - - RTCP(Y,X)- - - RTP(X,Y)- - - RTP(X,Y)- - - RTP(X,Y)

From Y to X:
RTP(Y,X)- - - RTP(Y,X)- - - RTCP(X,Y)- - - RTP(Y,X)- - - RTP(Y,X)- - - RTP(Y,X)

This is a normal and customary use of the RTP (RFC3550) protocol.

The path taken by the packet stream from X to Y and from Y to X is independently determined by the router within the packet network. This means that the path may, and often is, different for each packet stream. For example, FIG. 1 shows one path 2 a packet may take from endpoint M to endpoint N in a network 8 that includes a plurality of nodes O, P, Q, R, S, and T. A different path 4 is shown from endpoint N to endpoint M.

It is desirable for the routing function to be aware of problems related to congestion as it may affect routing decisions, and may be used to trigger re-routing of calls. This does raise a problem as the router is generally unaware of problems occurring between the router and the receiving endpoint. For instance, node R, a router located between endpoint M and endpoint N in the network 8 depicted in FIG. 1, would be unaware of a network congestion problem at node P because node P is located between node R and endpoint N on the path 2. If node R were aware of the network congestion problem at node P, node F could use a different route for packets to avoid node P, such as path 6 shown in FIG. 2, thereby improving the quality of the multimedia stream. One solution would be for router R to examine performance reports coming from endpoint N, however this is both complex to implement and may be impractical if the packet stream from endpoint N to endpoint M follows a different route than that from endpoint M to endpoint N.

Prior art solutions to this problem include the FECN (Forward Explicit Congestion Notification) and BECN (Backward Explicit Congestion Notification) bits within a Frame Relay frame header, which can be used to throttle traffic based on switch congestion. These are "binary" in operation and are intended only to signal back to a source of packets that it should restrict its output. This would not work in most multimedia applications for several reasons: (a) the packet rate must stay constant in order to meet the delivery requirements of voice or real-time video, (b) in multimedia applications the corrective action is to trigger re-routing or a change in prioritization.

A need therefore exists for an improved solution to this problem that is scaleable to very large networks.

SUMMARY OF THE INVENTION

The present invention answers this need by providing a system and method wherein each endpoint of a real-time packet stream transmits (1) feedback reports that describe the quality of the stream received by the endpoint and (2) forward reports that are based on the feedback reports received by the endpoint and that describe the quality of the stream received by the other, remote endpoint.

Further objects, features and advantages will become apparent upon consideration of the following detailed description of the invention when taken in conjunction with the drawing and the appended claims.

DETAILED DESCRIPTION OF THE INVENTION

Figure 1:
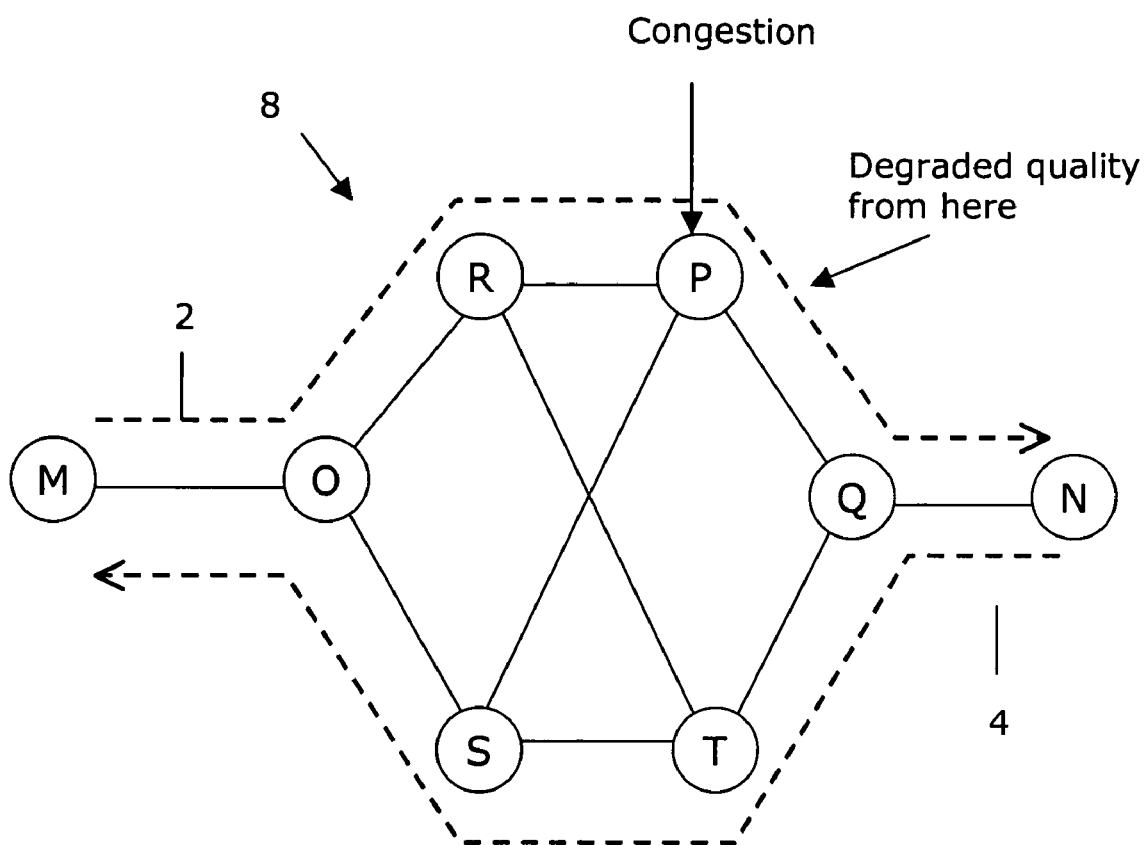
FIG. 1 is a relational diagram showing example transmission paths for packets to take between endpoints in a network having a plurality of nodes.
Figure 2:
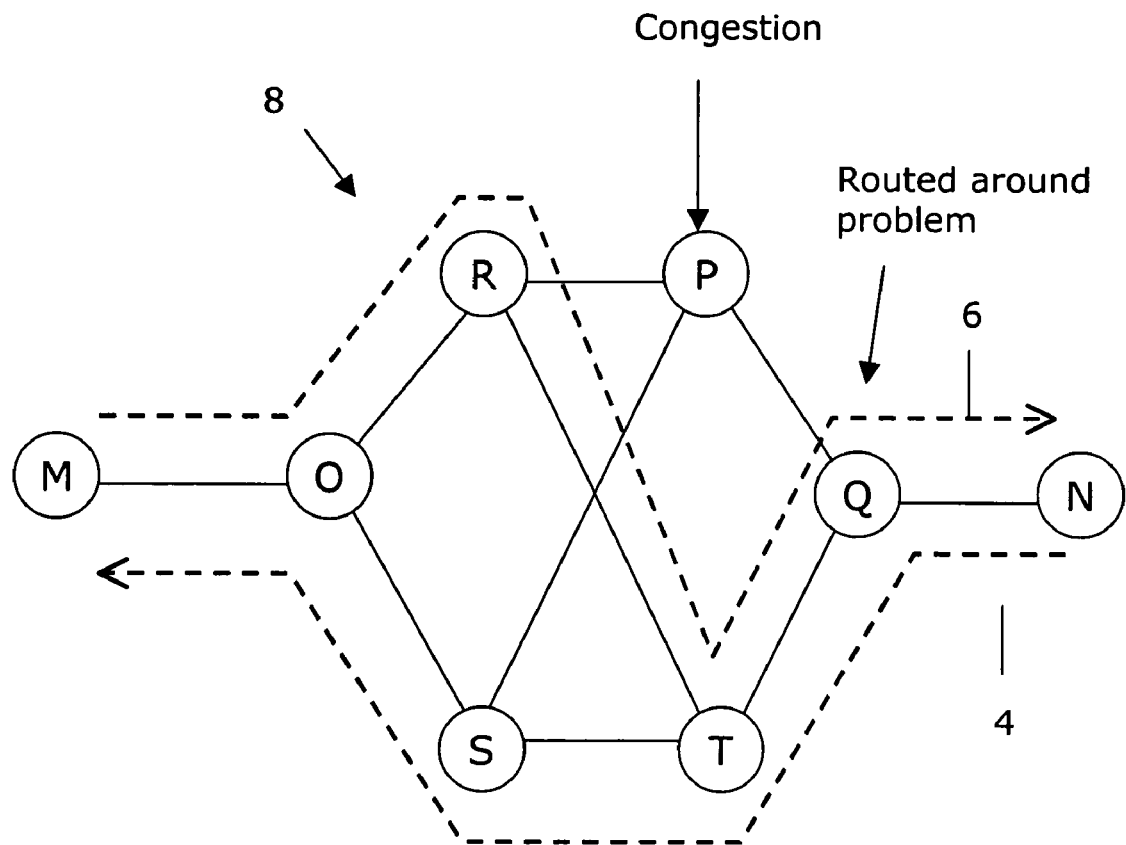
FIG. 2 is a relational diagram showing a desired transmission path for packets to take between endpoints in a network, wherein the network includes a network congestion problem at a node.
Figure 3:
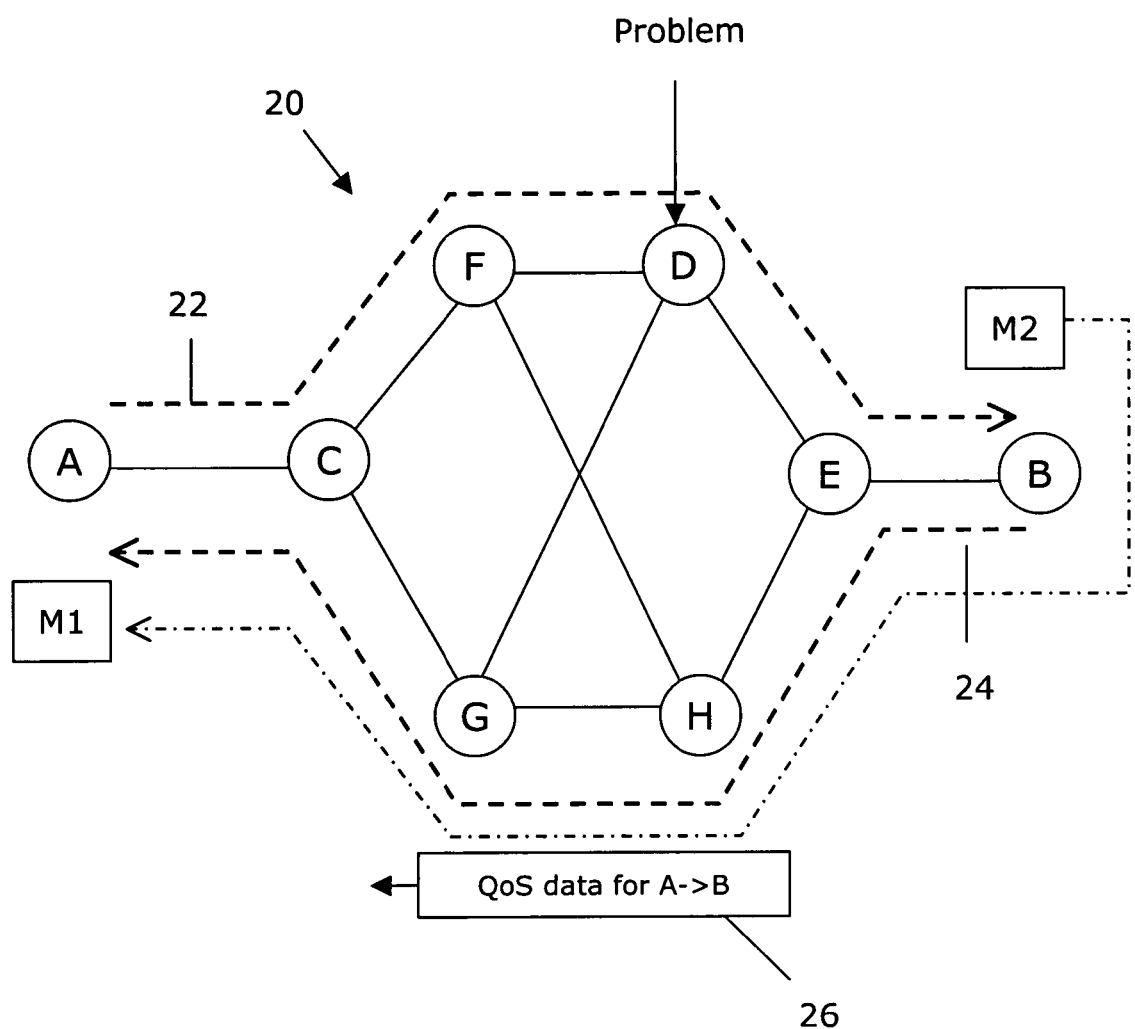
FIG. 3 is a relational diagram showing the transmission of a feedback report between endpoints in an embodiment of the present invention.

With reference to FIG. 3, a network 20 is shown that includes a first endpoint A and a second endpoint B connected via a plurality of nodes, C, D, E, F, G and H. Each of the first endpoint A or the second endpoint B may comprise an IP phone, a media gateway, a videoconferencing system, or the like. In use, the first endpoint A transmits a first packet stream 22 to the second endpoint B and the second endpoint B transmits a second packet stream 24 to the first endpoint A to provide a real-time flow of multimedia (voice or video) packets.

A. Monitoring Quality.

In the described embodiment, a first monitor M1 is provided at the first endpoint A and a second monitor M2 is located at the second endpoint B. In other embodiments, one or both of the monitors may be provided at a connection point in the network, wherein the connection point is preferably located relatively close to the respective endpoint. The first and second monitor M1 and M2 each include a performance monitoring component for monitoring the second packet stream 24 and the first packet stream 22, respectively, for quality. In one embodiment, the performance monitoring component of each monitor M1 and M2 monitors the incoming packet stream 22 or 24 by determining a level of at least one impairment and creating a quality measure associated with the packet stream 22 or 24. Such monitoring may be performed at periodic intervals, such as every ten seconds, resulting in the creation of several quality measures during the transmission of the packet streams 22 and 24. Such impairments may comprise, without limitation, packet delay, packet loss (wherein some packets are lost or arrive so late that they are discarded), jitter (wherein the arrival time of the packets varies), or distortion. The quality measure may comprise, without limitation, an average packet delay, an average packet loss rate, an average jitter, or an average distortion.

In various embodiments, one or both of the monitors is a commercially available quality of service monitor such as VQmon, which is available from Telchemy, Incorporated. ("VQmon" is a trademark of Telchemy, Incorporated.) VQmon is more fully described in U.S. Pat. No. 6,741,569 entitled "Quality of Service Monitor for Multimedia Communications System," U.S. patent application Ser. No. 09/574,472 entitled "Dynamic Quality of Service Monitor," and U.S. patent application Ser. No. 10/802,536 entitled "Quality of Service Monitor for Multimedia Communications System," which are incorporated herein by reference.

By monitoring the incoming packet stream 22 or 24 for quality, the first and second monitor M1 and M2 are able to identify when a network problem, such as congestion, a node failure, or a line card failure, is located in the transmission path taken by the received packet stream 22 or 24. For example, and with continuing reference to FIG. 3, if a network problem was associated with node D, the performance monitoring component of the second monitor M2 would detect a high impairment level associated with the packet stream 22 received by the second endpoint B and would create a quality measure that indicates that the network problem is located on the transmission path from the first endpoint A to the second endpoint B.

B. Creating Feedback Reports.

The first and second monitor M1 and M2 each also include a feedback reporting component. The feedback reporting component of each monitor M1 and M2 creates a feedback report that describes the quality of the packet stream 22 or 24 received by the endpoint A or B. For instance, and with continuing reference to FIG. 3, the feedback reporting component of the second monitor M2 analyzes the quality measure created by the performance monitoring component of the second monitor M2 and creates a feedback report 26 using the quality measure. Accordingly, the feedback report 26 describes the quality of the packet stream 22 received by the second endpoint B. In one embodiment, the feedback reporting component copies the quality measure created by the performance monitoring component of the second monitor M2 and formats the quality measure for inclusion in the feedback report 26. Thus, returning to the above example wherein the network 20 is experiencing a problem, the feedback report 26 would indicate that a network problem is located on the transmission path from the first endpoint A to the second endpoint B.

In certain embodiments, the feedback report 26 may comprise a RTCP RR report or a RTCP XR report. In other embodiments, the feedback report 26 may comprise a report that is compatible with other suitable protocols, including without limitation H.323 (created by the International Telecommunication Union), SIP (Session Initiation Protocol), or MGCP (Media Gateway Control Protocol).

After creating the feedback report 26, the feedback reporting component of the second monitor M2 includes the feedback report 26 in the second packet stream 24 that is transmitted from the second endpoint B to the first endpoint A. In various embodiments, feedback reports are created and/or included in the second packet stream 24 at periodic intervals, such as every ten seconds, resulting in several feedback reports being transmitted from the second endpoint B to the first endpoint A.

Figure 4:
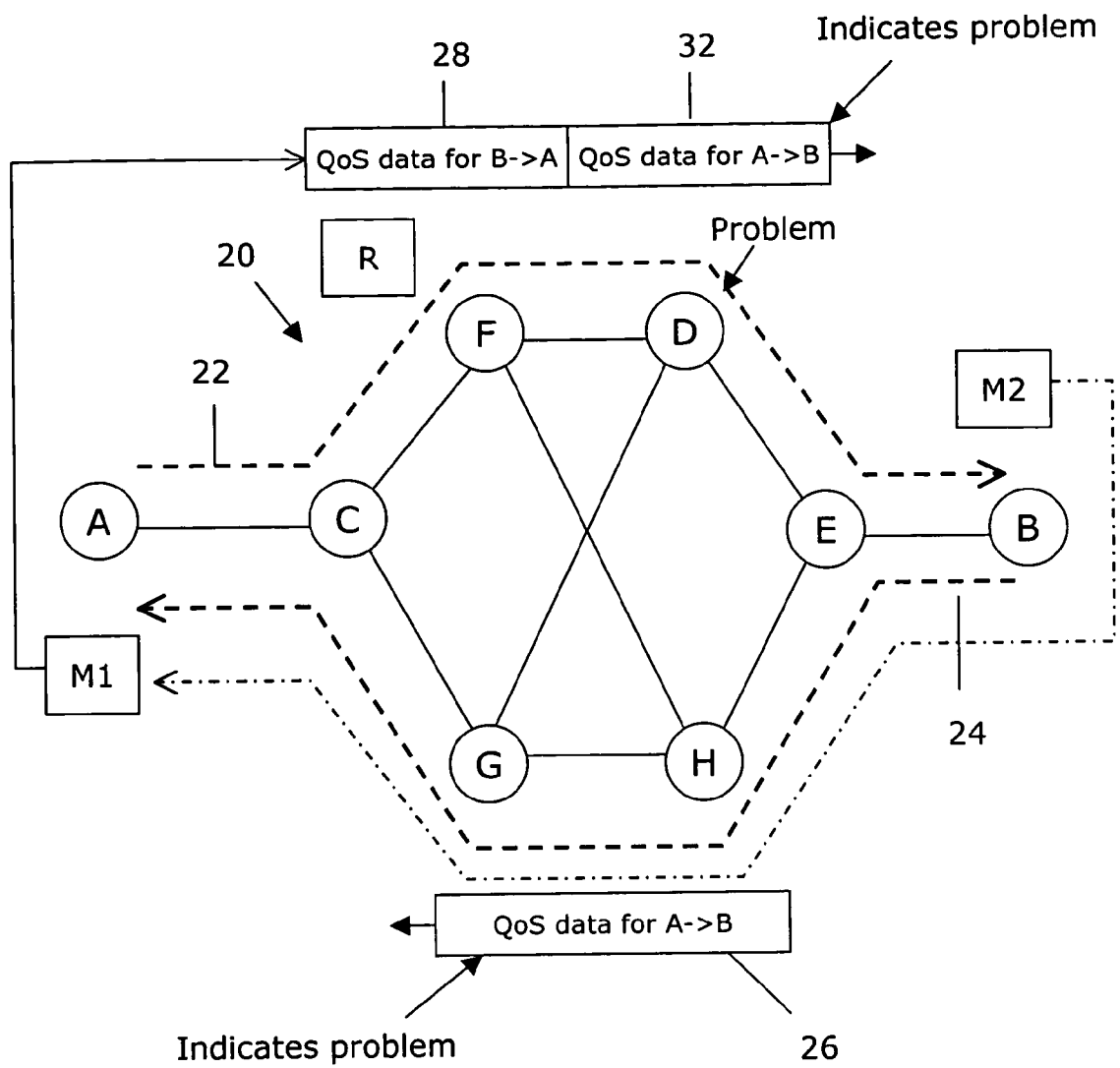
FIG. 4 is a relational diagram showing the transmission of feedback reports and a forward report between endpoints in an embodiment of the present invention.

Similarly, and with reference to FIG. 4, the feedback reporting component of the first monitor M1 analyzes the quality measure created by the performance monitoring component of the first monitor M1 and creates a feedback report 28 using the quality measure. Accordingly, the feedback report 28 describes the quality of the packet stream 24 received by the first endpoint A. In one embodiment, the feedback reporting component copies the quality measure created by the performance monitoring component of the first monitor M1 and formats the quality measure for inclusion in the feedback report 28.

After creating the feedback report 28, the feedback reporting component of the first monitor M1 includes the feedback report 28 in a packet stream for transmission to the second endpoint B. Because packet streams are persistent and may last for several minutes, in most instances the feedback report 28 will be created in time to be included in the first packet stream 22.

C. Creating Forward Reports.

The first and second monitor M1 and M2 further include a forward reporting component. The forward reporting component of each monitor M1 and M2 creates a forward report based on the feedback report received by the endpoint B or A, respectively. For example, and with continuing reference to FIG. 4, the forward reporting component of the first monitor M1 creates a forward report 32 based on the feedback report 26 received by endpoint A that describes the quality of the packet stream 22 received by the second endpoint B. In one embodiment, the forward reporting component of the first monitor M1 copies the quality measure that was previously copied and formatted by the feedback reporting component of the second monitor M2 and formats the quality measure for inclusion in the forward report 32. Thus, continuing with the example wherein the network is experiencing a problem, the forward report 32 would indicate that a network problem is located on the transmission path from the first endpoint A to the second endpoint B.

After creating the forward report 32, the forward reporting component of the first monitor M1 includes the forward report 32 in the first packet stream 22, at least a portion of which is transmitted along the route from the first endpoint A to the second endpoint B. In one embodiment, the forward report 32 is appended to the feedback report 28 created by the feedback reporting component of the first monitor M1.

D. Routing Packets.

An adaptive routing component R is provided at a router in the network 20. The adaptive routing component R comprises a forward report analysis component for (1) analyzing forward reports and (2) determining whether a different route should be used when forwarding the packets that comprise the packet streams being transmitted between the endpoints A and B. The adaptive routing component further comprises a re-routing component for re-routing packets within a packet stream if the forward report analysis component determines that a different route should be used. In various embodiments, the re-routing component selects the different route from a set of predetermined routes or creates the different route using distance and cost algorithms as known in the art.

For instance, and with continuing reference to FIG. 4, the adaptive routing component R may be provided at node F, wherein node F is a router. The forward report analysis component of the adaptive routing component R analyzes the forward report 32 created by the first monitor M1 and included in the first packet stream 22, and determines, based on the forward report 32, whether a different route should be used for forwarding packets in the first packet stream 22 and/or in subsequent packet streams to the second endpoint B. In one embodiment, the forward report analysis component compares the quality measure of the forward report 32 to a threshold. If the quality measure exceeds the threshold, the forward report analysis component indicates to the re-routing function that a different route should be used.

In another embodiment, a third monitor is provided at the router for monitoring the first packet stream 22 for quality. Like the first and second monitor M1 and M2, the third monitor may monitor the incoming packet stream 22 by determining a level of at least one impairment and creating a router quality measure associated with the packet stream 22. In this embodiment, the forward report analysis component compares the quality measure of the forward report 32 to the router quality measure. If the router quality measure (which indicates the quality upstream of the router) indicates that the quality of the first packet stream 22 is significantly higher than, or that the level of at least one impairment is significantly lower than, that indicated by the forward report 32 (which indicates the quality downstream of the router), the forward report analysis component indicates to the re-routing function that a different route should be used.

Figure 5:
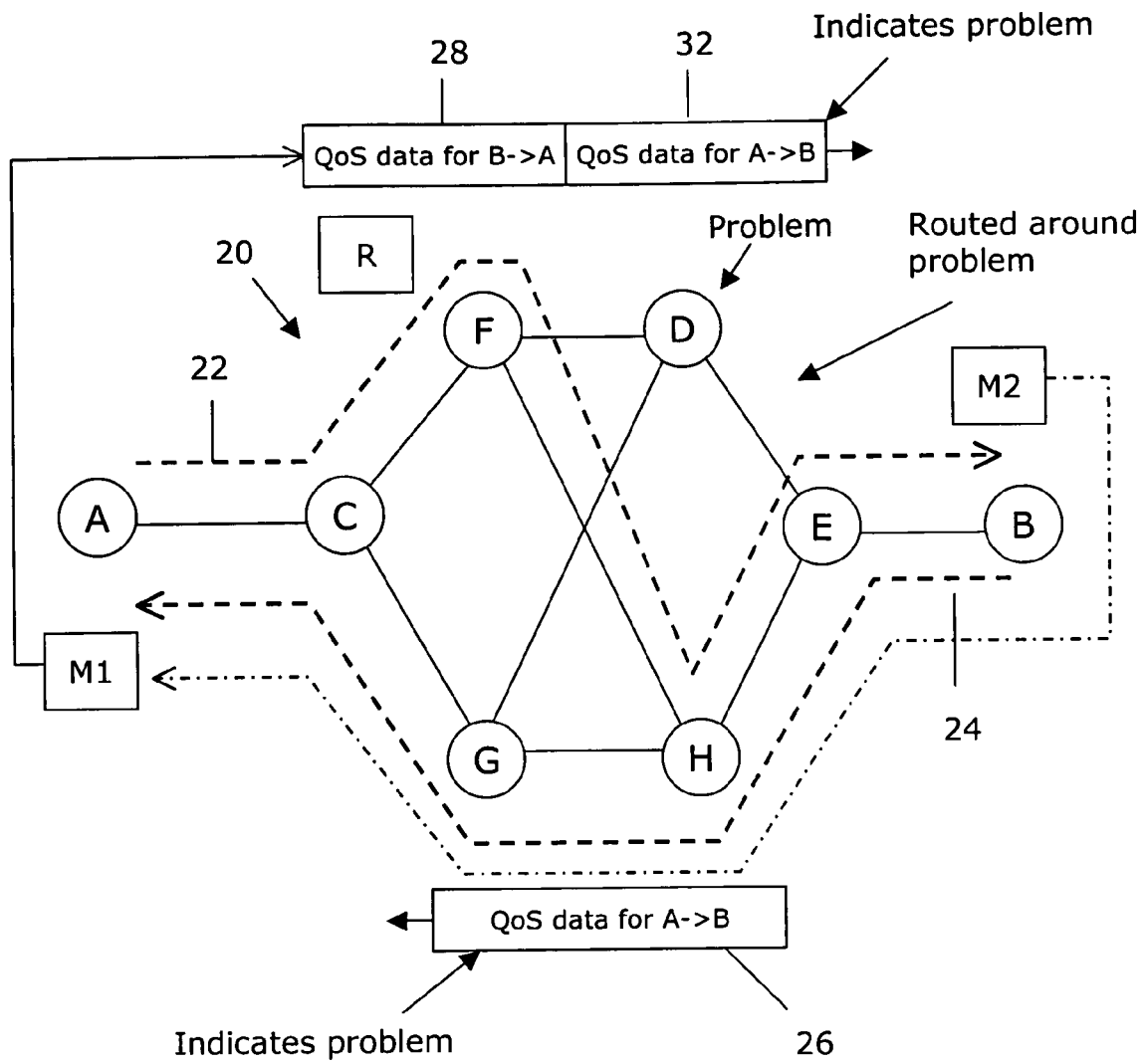
FIG. 5 is a relational diagram showing a re-routing of packets to avoid a network problem in an embodiment of the present invention.

Thus, in the network problem example, the forward report analysis component of the adaptive routing component R is configured to predict from the forward report 32 that a network problem is located on the route between the adaptive routing component R and the second endpoint B. As a result, the re-routing component will transmit at least one packet in the first packet stream, and/or in subsequent packet streams, using a different route, such as the route shown in FIG. 5, to avoid the network problem at node D, thereby increasing the quality of the packet stream received by endpoint B.

While this invention has been described with reference to preferred embodiments thereof, it is to be understood that variations and modifications can be affected within the spirit and scope of the invention as described herein and as described in the appended claims.

I claim:

1. A method for improving the quality of packet streams transmitted between a first endpoint and a second endpoint via a router in a network comprising the steps of:

a. monitoring a first packet stream for quality, wherein the first packet stream is transmitted from the first endpoint to the second endpoint;
   b. creating a feedback report, wherein the feedback report describes a quality of the first packet stream;
   c. including the feedback report in a second packet stream, wherein the second packet stream is transmitted from the second endpoint to the first endpoint;
   d. creating a forward report based on the feedback report;
   e. including the forward report in the first packet stream, wherein at least a portion of the first packet stream is transmitted along a route from the first endpoint toward the second endpoint; and
   f. at the router determining, based on the forward report, whether a different route should be used;
   wherein said router is located in said network intermediate said first endpoint and said second endpoint.

2. A method as defined in claim 1, wherein the determining whether a different route should be used includes predicting whether a network problem is located between the router and the second endpoint, further comprising the step of:
   if a network problem is predicted between the router and the second endpoint, transmitting at least one packet in the first packet stream using the different route to avoid the network problem.

3. A method as defined in claim 1, wherein the monitoring of the first packet stream for quality is performed at the second endpoint.

4. A method as defined in claim 1, wherein the monitoring of the first packet stream includes determining a level of at least one impairment and creating a quality measure associated with the first packet stream.

5. A method as defined in claim 4, wherein the creating a feedback report includes formatting the quality measure for inclusion in the feedback report and the creating a forward report includes formatting the quality measure from the feedback report for inclusion in the forward report.

6. A method as defined in claim 5, wherein the determining whether a different route should be used includes comparing the quality measure of the forward report to a threshold.

7. A method as defined in claim 5, wherein the determining whether a different route should be used includes comparing the quality measure of the forward report to a router quality measure.

8. A system for improving the quality of packet streams transmitted between a first endpoint and a second endpoint in a network comprising:

a. a performance monitoring component for monitoring a first packet stream for quality, wherein the first packet stream is transmitted from the first endpoint to the second endpoint;
   b. a feedback reporting component for creating a feedback report and for including the feedback report in a second packet stream, wherein the feedback report describes a quality of the first packet stream and wherein the second packet stream is transmitted from the second endpoint to the first endpoint;
   c. a forward reporting component for creating a forward report based on the feedback report and for including the forward report in the first packet stream, wherein at least a portion of the first packet stream is transmitted along a route from the first endpoint toward the second endpoint; and
   d. a forward report analysis component for determining, based on the forward report, whether a different route should be used;

wherein said forward analysis component is located in said network intermediate said first endpoint and said second endpoint.

9. A system as defined in claim 8, wherein the forward report analysis component is configured to predict from the forward report whether a network problem is located between the forward report analysis component and the second endpoint, further comprising:

a re-routing component for transmitting at least one packet in the first packet stream using the different route to avoid the network problem if the network problem is predicted between the forward report analysis component and the second endpoint.

10. A system as defined in claim 9, wherein the performance monitoring component is located at the second endpoint.

11. A system as defined in claim 10, wherein the performance monitoring component is configured to determine a level of at least one impairment and create a quality measure associated with the first packet stream.

12. A system as defined in claim 11, wherein the feedback reporting component is configured to format the quality measure for inclusion in the feedback report and the forward reporting component is configured to format the quality measure from the feedback report for inclusion in the forward report.

13. A system as defined in claim 12, wherein the forward report analysis component is configured to compare the quality measure of the forward report to a threshold.

14. A system as defined in claim 12, wherein the forward report analysis component is configured to compare the quality measure of the forward report to a router quality measure.

* * * * *